United States Patent [19]

Bornhorst et al.

[11] Patent Number: 5,529,799
[45] Date of Patent: Jun. 25, 1996

[54] APPARATUS AND METHODS FOR RECOUPING SCRAP DOUGH MATERIAL

[75] Inventors: William C. Bornhorst, Plymouth, Minn.; Mary K. Cartstensen, Richmond, Va.; Steven A. Stein, Buffalo; Michael P. Waldherr, Brooklyn Park, both of Minn.

[73] Assignee: General Mills, Inc., Minneapolis, Minn.

[21] Appl. No.: 360,901

[22] Filed: Dec. 21, 1994

Related U.S. Application Data

[63] Continuation-in-part of Ser. No. 903,294, filed as PCT/US93/05937, Jun. 22, 1993, Pat. No. 5,240,731.

[51] Int. Cl.$^6$ .............................. A21C 5/00; A23P 1/00
[52] U.S. Cl. .................. 426/549; 264/153; 264/163; 425/294; 425/363; 426/497; 426/503; 426/518
[58] Field of Search ........................ 426/549, 497, 426/503, 518, 496; 425/294, 363; 264/153, 163

[56] References Cited

U.S. PATENT DOCUMENTS

| | | | |
|---|---|---|---|
| 3,880,069 | 4/1975 | Moline | 425/294 |
| 3,956,517 | 5/1976 | Curry et al. | 426/502 |
| 3,998,978 | 12/1976 | Lawrence et al. | 426/621 |
| 4,075,359 | 2/1978 | Thulin | 426/503 |
| 4,108,033 | 8/1978 | Bembenek | 83/670 |
| 4,153,733 | 5/1979 | Pierce | 426/438 |
| 4,350,251 | 9/1982 | Merck | 209/642 |
| 4,469,476 | 9/1984 | Cavanagh et al. | 425/363 |
| 4,973,481 | 11/1990 | Hunt et al. | 426/629 |
| 5,063,068 | 11/1991 | Cavanagh | 426/503 |
| 5,240,731 | 8/1993 | Bornhorst et al. | 426/503 |
| 5,306,133 | 4/1994 | Dayley | 426/503 |

FOREIGN PATENT DOCUMENTS

| | | |
|---|---|---|
| 1016011 | 8/1977 | Canada . |
| 0377161 | 7/1990 | European Pat. Off. . |
| 0452982 | 10/1991 | European Pat. Off. . |
| 2237719 | 5/1991 | United Kingdom . |
| WO9105483 | 5/1991 | WIPO . |

*Primary Examiner*—George Yeung
*Attorney, Agent, or Firm*—L. MeRoy Lillehaugen; John A. O'Toole; Alan D. Kamrath

[57] ABSTRACT

Apparatus and methods of fabricating half products in the field of puffed snack piece fabrication are disclosed including a rotary cutter (16) having an opposed pair of rollers (18). At least one of the rollers (18) of the rotary cutter (16) has cavities (112) arranged in a first, central portion (110) which stamp out first pieces and cavities (118) arranged in second and third, boundary portions (114, 116) for stamping out second pieces from the remaining portions of a continuous dough sheet (14). The first pieces are of the desired shape and size for the half products, and the second pieces are of a size and shape mechanically separable from the first pieces. In first preferred forms, the first pieces have tesselated shapes allowing the cavities (112) in the central portion (110) to be in a tight, juxtapositional pattern. In other preferred forms, the second pieces have nontesselated shapes, with pockets (113) of a pyramid shape located in the central portion (110) between the cavities (112) to reduce migration of the scrap material into the cavities (112) while the first pieces are stamped from the continuous dough sheet (14). After stamping, the first and second pieces are dried in an oven (134) and then separated by a separator (136). The dried first pieces form the half product. The dried second pieces can be ground in a grinder (138) and added to the ingredients (120) forming the dough prior to or during mixing in mixer (122). The mixed ingredients (120) are cooked and extruded as dough for formation into a sheet (12) by a sheeting apparatus (124). In the preferred form, the sheet (12) is flipped and aligned into a folded continuous two-ply sheet (14) prior to entering the rotary cutter (16).

36 Claims, 4 Drawing Sheets

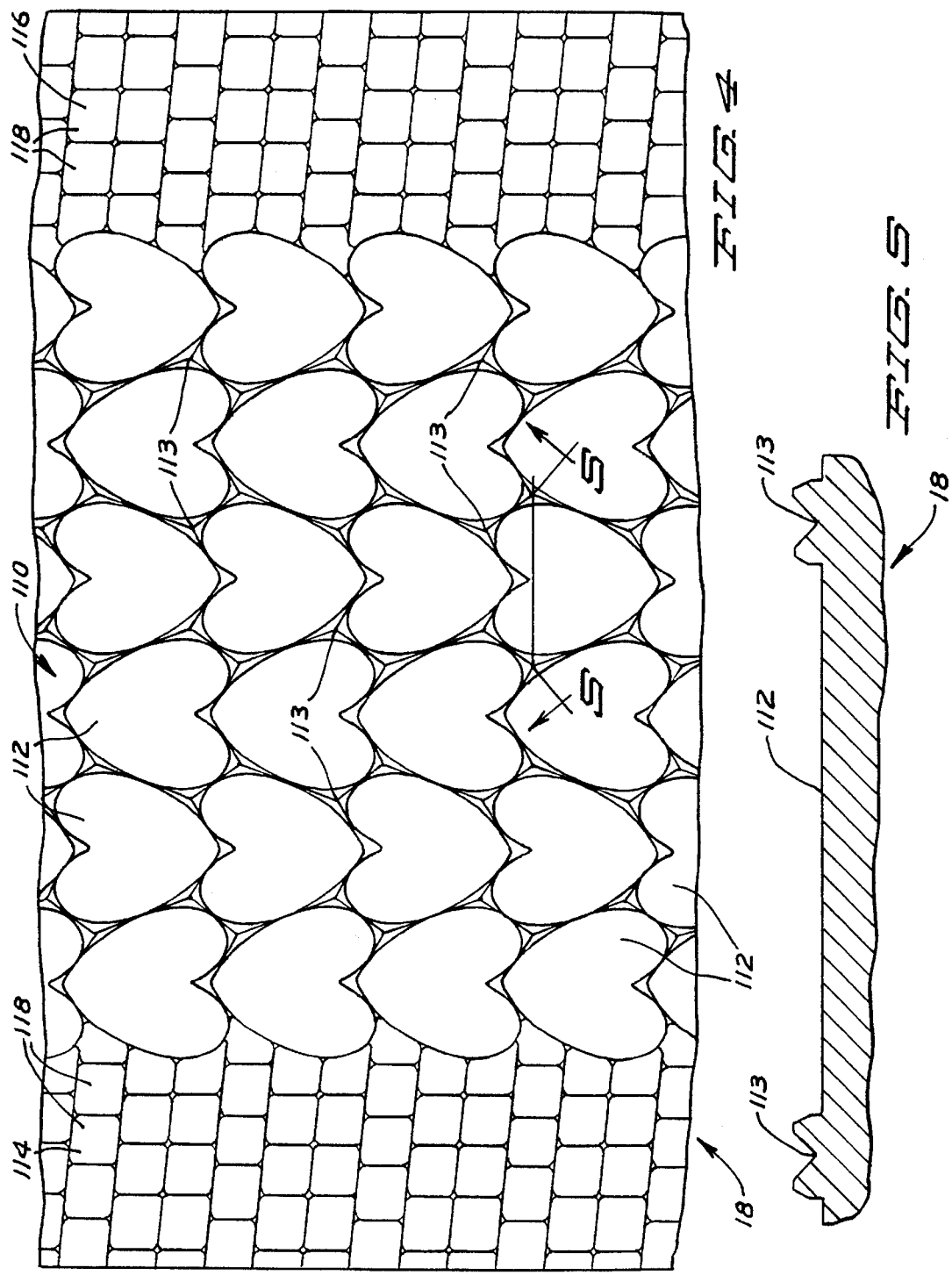

APPARATUS AND METHODS FOR RECOUPING SCRAP DOUGH MATERIAL

CROSS-REFERENCE

The present application is a continuation of International Application No. PCT/US 93/05937 filed Jun. 22, 1993 which is a continuation-in-part of U.S. application Ser No. 07/903,294 filed Jun. 24, 1992, now U.S. Pat No. 5,240,731.

BACKGROUND

The present invention generally relates to apparatus and methods for recouping scrap material, and particularly to apparatus and methods for recouping scrap material remaining after the desired shaped and sized pieces are cut from a continuous dough sheet for the preparation of a snack product by conventional deep fat frying.

One type of snack product which has gained wide market acceptance is the "puffed" snack product. In certain methods of preparation, a cooked farinaceous dough is formed into a single continuous dough sheet. This dough sheet is then run through a piece forming apparatus or rotary cutter which includes an opposed pair of rollers at least one of which has depressions which stamp out the desired shape and size pieces from the dough sheet. After formation of the dough pieces, the pieces are dried under controlled conditions from a moisture content of about 18% down to a moisture content of between 10% and 15% to form a half product or pellet. The moisture content of the half product is sufficiently low to exhibit extended shelf stability. The snack product is prepared from the half product by conventional deep fat frying. The frying of the half product generates steam volumes inside of the half product to puff the half product resulting in a light, puffed snack product having surface corrugations.

The sale of snack food products is a highly competitive business. The novelty of snack food products decline rapidly, as new and different types of snack foods are introduced to maintain or increase market share. Puffed snack products can be varied in various ways such as by changing the shapes, sizes, and surface corrugations of the pieces or by changing the composition of the dough from which the half products are prepared. Another variation is to have the puffed snack product of a hollow structure, with the hollow configuration resulting from the fabrication of the half products from a two-layer laminated dough sheet. One method of forming a laminated dough sheet is to fold a single continuous dough sheet into a two-plied dough sheet as set forth in U.S. Pat. Nos. 5,092,757 and 5,217,739.

As set forth previously, the frying of the half product generates steam volumes inside of the half product to puff the half product. If the half product is not completely whole in shape, the resulting puffed snack product will not have consistent size and shape. This is especially important for the two-ply half product where the steam generated inside of the half product results in a unique, slightly pillowed, crisp, puffed snack product, with half products which are not formed properly such as not being completely whole in shape not producing product having this appearance which are preferred by the consumer. To insure that all pieces are completely formed and possess the desired texture and appearance, the width of the cutting pattern on the rotary cutter was designed to be narrower than the width of the two-ply folded sheet; in other words, the two-ply sheet overlaps the cutting pattern. However, this solution, while insuring that all pellets are of desired texture and shape, results in another difficult problem: the formation of excess scrap material. Unlike cookie, cracker, or even tortilla chip processes, where the scrap material is easily refed directly into the sheeter, scrap material in the production of half products can not be refed directly into the sheeter when forming puffed snack product of the present invention for a variety of reasons.

Accordingly, it is an object of the present invention to provide novel apparatus and methods for recouping scrap material remaining after the stamping of the desired shaped and sized pieces from a continuous dough sheet.

Another object of the present invention is to provide such novel apparatus and methods which are efficient and commercially feasible.

It is further an object of the present invention to provide such novel apparatus and methods where the scrap material is cut into shapes which can be separated from the desired shaped pieces by using conventional particle separators. It is an aim of the present invention to cut the scrap material into pieces of a smaller shape than the desired shaped pieces.

It is further an object of the present invention to provide such novel apparatus and methods where the first pieces have tessellated shapes which can be cut in a tight, juxta-positional pattern with no scrap material between the first pieces. It is further an aim of the present invention to provide such novel apparatus and methods where the first pieces have nontesselated shapes, with the scrap material between the first pieces being stamped by pockets formed in the lands stamping the first pieces.

It is further an object of the present invention to provide such novel apparatus and methods where the scrap material is dried in the drying oven with the desired shaped pieces prior to separation. It is further an aim of the present invention to grind the dried, scrap material for refeeding into the dry ingredient mix and thereby substantially reducing ingredient costs.

SUMMARY

Surprisingly, the above objectives can be satisfied in the field of puffed snack piece fabrication by providing, in the preferred form, apparatus and methods of fabricating half products where first and second pieces of mechanically separable sizes and shapes are simultaneously stamped from a continuous sheet (which is a folded two-ply sheet in the most preferred form) and then mechanically separated.

In another aspect of the invention, the first and second pieces are dried before their mechanical separation, with the dried first pieces forming the half product and the dried second pieces being ground and refed back into the process to form the dough formed into the sheet.

In still other aspects of the invention, pockets are formed in the land areas between portions of the first cavities having nontesselated shapes which are not in juxtaposition for stamping the scrap material between the first pieces reducing the migration of the scrap material into the first cavities.

The present invention will become clearer in light of the following detailed description of illustrative embodiments of this invention described in connection with the drawings.

DESCRIPTION OF THE DRAWINGS

FIGS. 2, 3, and 4 show partial, flat views of a roller for an apparatus for forming pieces from the dough sheet according to the preferred teachings of the present invention.

FIG. 5 shows a cross-sectional view of the roller of FIG. 4 according to section line 5—5 of FIG. 4.

Figure 1:
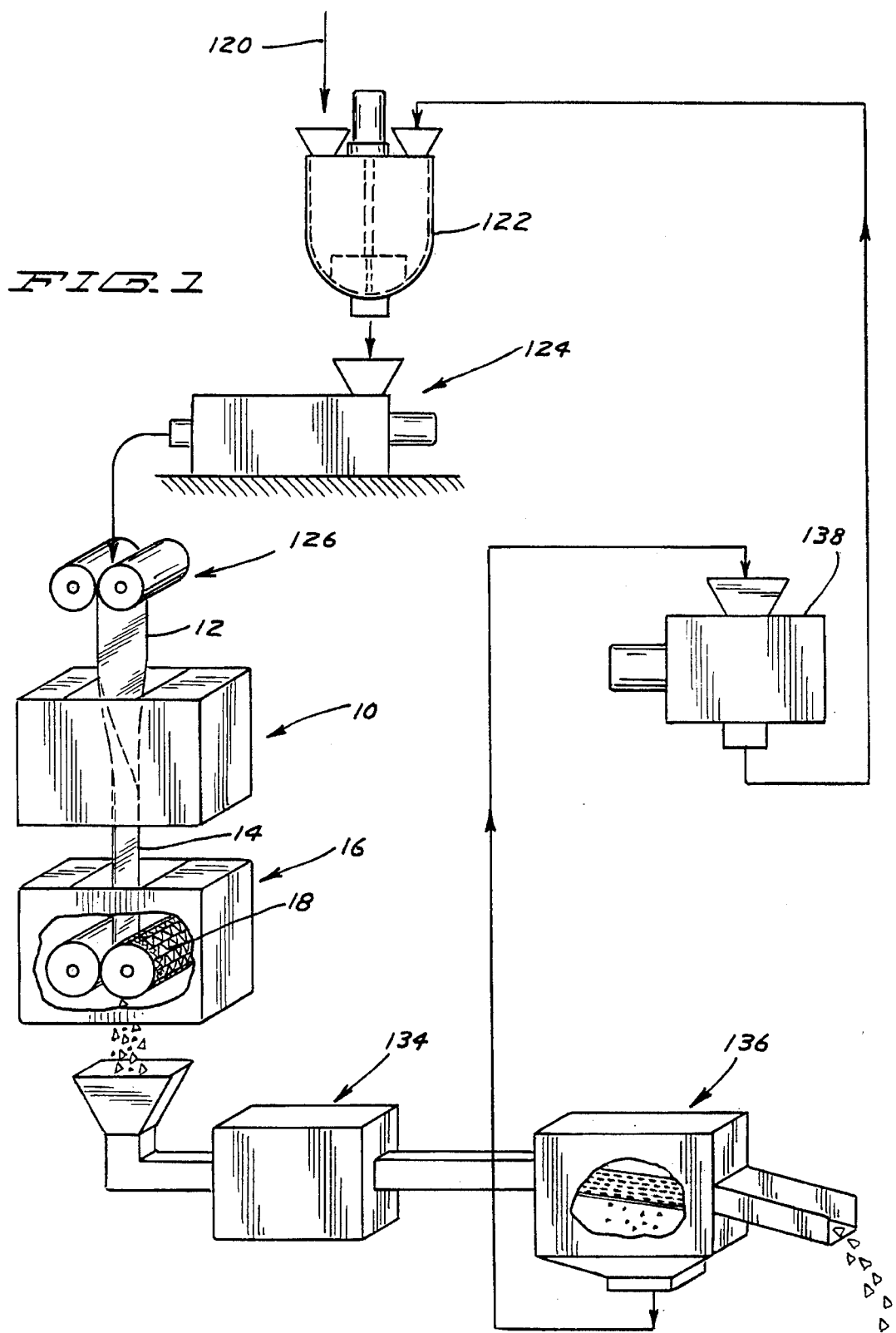
FIG. 1 shows a diagrammatic view of the method of forming half products according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "face", "edge", and similar terms are used herein, it should be understood that these terms have reference only to the structure shown in the drawings as it would appear to a person viewing the drawings and are utilized only to facilitate describing the invention.

DESCRIPTION

Referring now to the drawings and in particular to FIG. 1, an apparatus for flipping and aligning a dough sheet according to the preferred teachings of the present invention is generally designated 10 and can be of the type shown in U.S. Pat. Nos. 5,092,757 and 5,217,739. Particularly, apparatus 10 folds a single continuous dough sheet 12 formed of a cooked farinaceous dough into a folded, continuous two-ply dough sheet 14. Dough sheet 12 has first and second opposed major faces and two opposed free edges. Folded dough sheet 14 has two opposed free edges and outside faces reduced about one-half in area and which are spaced generally twice the thickness of dough sheet 12.

Figure 2:
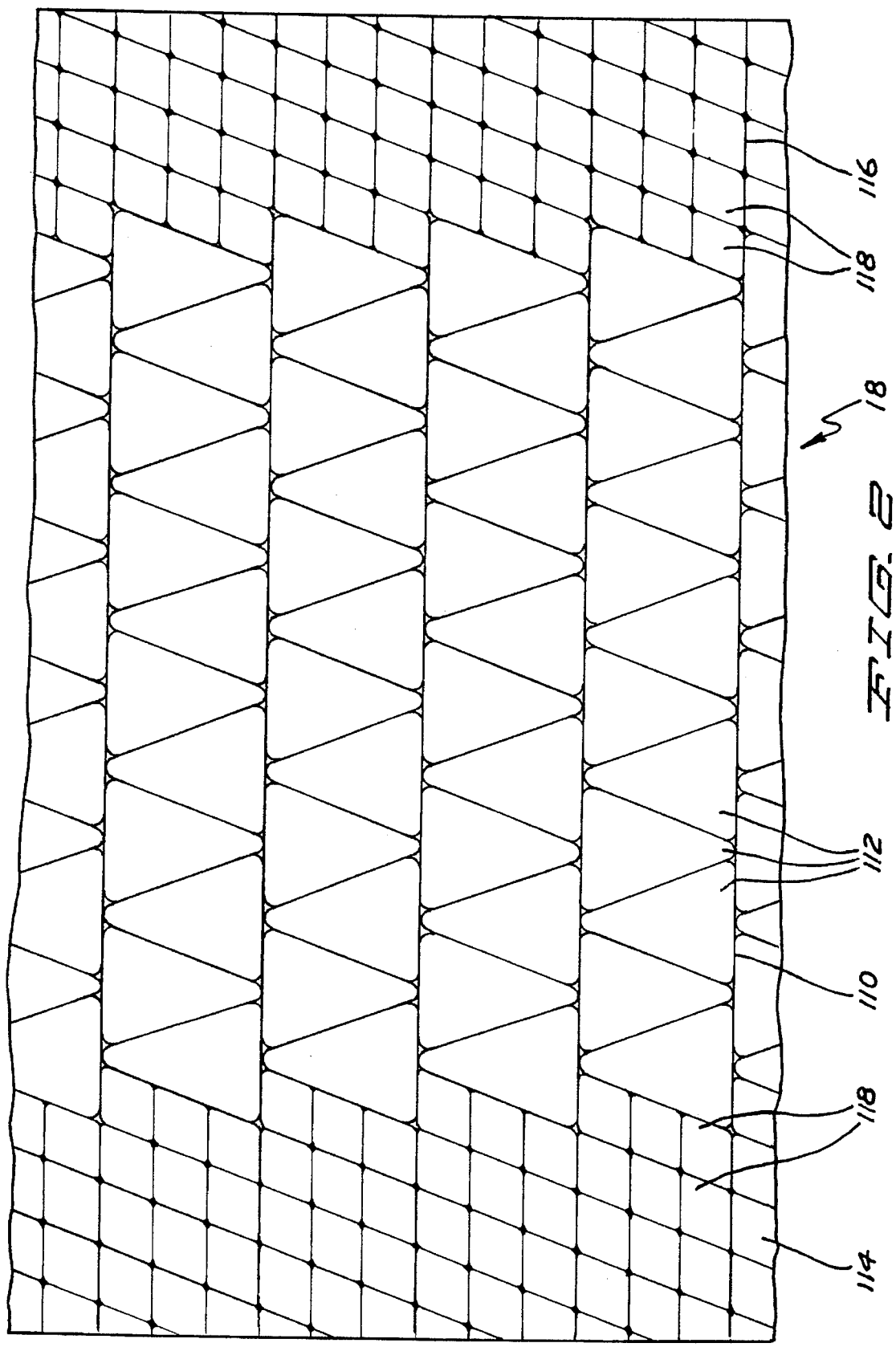
Figure 9:
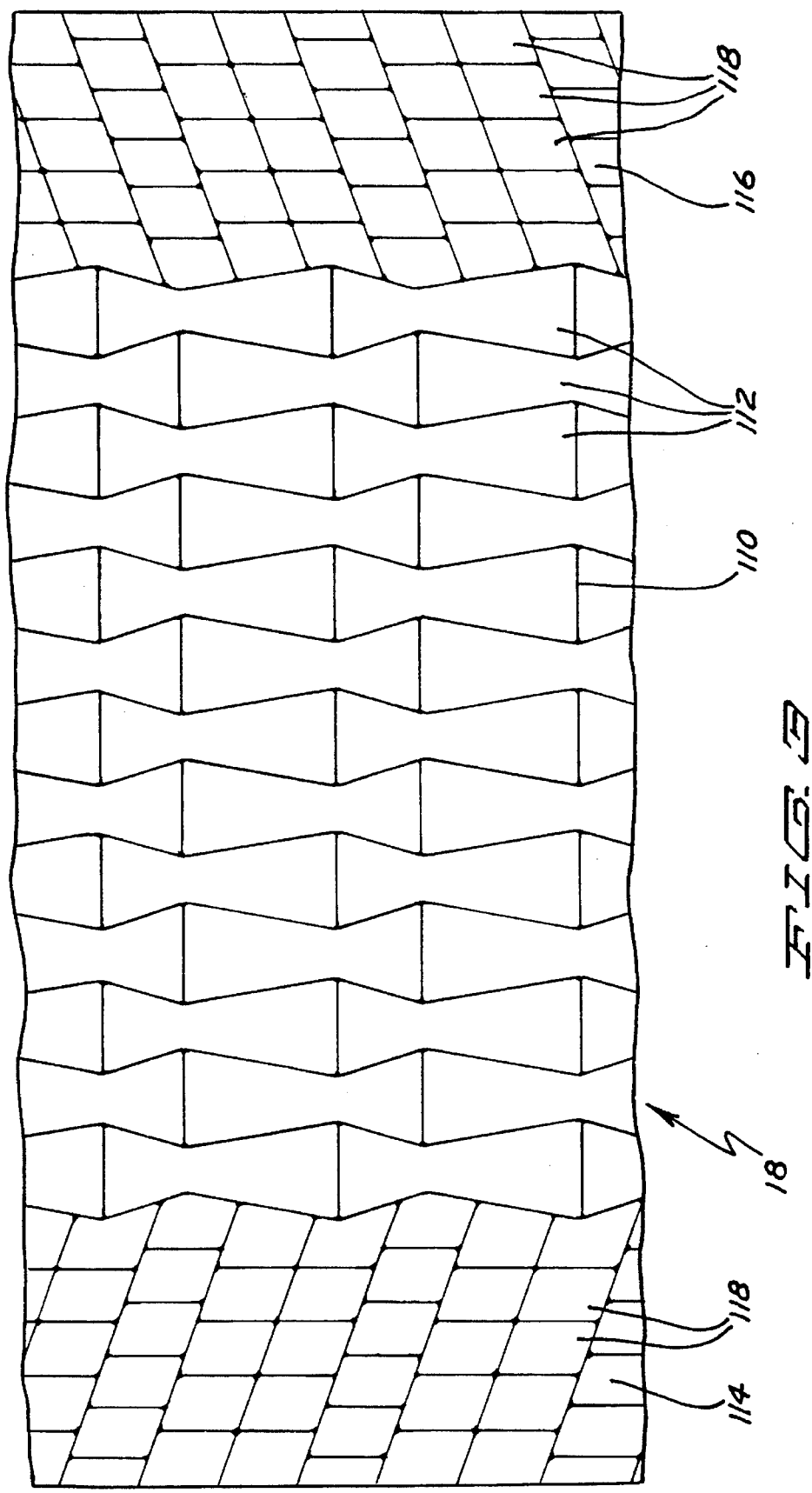

Folded continuous dough sheet 14 can be provided by apparatus 10 to a piece forming apparatus or rotary cutter 16 conveniently constructed having opposed pair of rollers 18, with at least one of rollers 18 having cavities or depressions which stamp out the desired shape and size pieces from folded continuous dough sheet 14. Referring now to FIGS. 2–4, at least one of rollers 18 of piece forming apparatus 16 includes a first, central portion 110 extending circumferentially around roller 18. First portion 110 includes a multiplicity of cavities 112 of the desired shape and size for forming pieces which in turn are dried to form the half products or pellets. First portion 110 is located intermediate the ends of roller 18 and of folded dough sheet 14 and has a width substantially less than the width of roller 18 and of folded dough sheet 14. Additionally, second and third, boundary portions 114 and 116 extend circumferentially around roller 18 and include a multiplicity of cavities 118 of a shape and/or size substantially different than cavities 112 for forming second pieces which are mechanically separable from the first pieces. The bottom surfaces of cavities 112 and 118 are concentric to the periphery of roller 18. Particularly, as dough sheet 14 passes between rollers 18, first and second pieces are stamped from dough sheet 14 with the land areas between and forming cavities 112 and 118 cutting dough sheet 14 at the nip between rollers 18. It can then be appreciated that the land areas cut dough sheet 14 by compressing dough sheet 14 between rollers 18 which forces the portion of dough sheet 14 abutted by the land areas between cavities 112 and 118 to move or migrate therefrom to an area of non-compression such as within cavities 112 and 118. This cutting and migration of dough sheet 114 can be enhanced by beveling the outer periphery of the land areas to include flat incline surfaces extending approximately one-half the height of the lands. It can then be appreciated that the portions remaining in folded dough sheet 14 after the stamping of the first pieces define the scrap material, with the second pieces being simultaneously stamped in the remaining portions as the first pieces are stamped from folded dough sheet 14.

In the preferred form, cavities 118 are generally of a parallelepiped shape and are of a size substantially smaller than cavities 112. In the most preferred form, cavities 118 are arranged in straight rows, with rows of cavities 118 in FIG. 2 being arranged parallel to the axis of roller 18 and in FIGS. 3 and 4 being arranged at an acute angle in the order of 20° to the axis of roller 18. It is believed that the angled nature of the rows of cavities 118 of FIGS. 3 and 4 may have reduced wear over rows of cavities 118 parallel to the roller axis of FIG. 2. Portions 114 and 116 extend from the outside boundaries or edges of portion 110 to the ends of rollers 18.

Cavities 112 of portion 110 can be of any desired shape and size. In a preferred form, cavities 112 of portion 110 have tessellated shapes in a generally tight, juxtapositional pattern. It can then be appreciated that the land areas between cavities 112 can be minimized along the entire periphery of cavities 112 and thus minimize the migration of dough sheet 14 from compressed areas between rollers 18 into cavities 112. Thus, in the preferred form, the first pieces are stamped from the central portion of continuous sheet 14 and the remaining portions of sheet 14 defining the scrap material are located generally exclusively between the first edges of the central portion and of sheet 14 and between the second edges of the central portion and of sheet 14. Examples of tessellated shapes include geometric shapes such as in the form of isosceles triangles as shown in the preferred form shown in FIG. 2 or in the form of sheaves (i.e. generally bow tie shape) as shown in the preferred form in FIG. 3, as well as squares, rectangles, or the like.

In other preferred forms, cavities 112 of portion 110 have nontesselated shapes which can not be placed in juxtapositional patterns. An example of nontesselated shapes include shapes having arcuate peripheries such as in the form of hearts as shown in the preferred form shown in FIG. 4. As it is desirable to have as many cavities 112 in portion 110 as possible, cavities 112 are positioned in a pattern which maximizes the portions of cavities 112 which are in juxtaposition while minimizing the area between the portions of cavities 112 which are not in juxtaposition. However, substantial land areas can exist between the portions of cavities 112 which are not in juxtaposition. Thus, dough migrating from these land areas between the portions of cavities 112 can result in an excess of dough material at that point. This excess of material is observable in the cut pieces and is also noticeable in the finished product which will not have consistent size, shape, and appearance which are preferred by the consumer. One manner of solving this problem would be to space cavities 112 in portion 110 by cavities for forming scrap pieces which are mechanically separable from the first pieces and allow the land areas to be minimized as in tessellated shapes. However, such a solution would reduce the number of first pieces cut by cavities 112 from dough sheet 14 and the production of apparatus 16. According to the teachings of the present invention, this problem is solved by providing a relief void or pocket 113 in the land areas between the portions of cavities 112 which are not in juxtaposition. In the most preferred form, pockets 113 are generally pyramid shaped and extend from the periphery of roller 18 radially inwardly, with the base at the periphery of roller 18 and the common vertex at a depth generally equal to 75% of the depth of cavities 112. It can then be appreciated that the area of roller 18 intermediate cavities 112 and pockets 113 engaging the other roller 18 (which can be either of the anvil or cutting type) is minimized to reduce the amount of dough which is required to migrate, with dough migrating from the land areas to both cavities 112 and pockets 113. Thus, excess dough material does not migrate to cavities 112 allowing the cut pieces and finished products to have consistent size, shape, and appearance.

It should then be further noted that the pyramid shape of pockets 113 is believed advantageous in the release of the pieces of dough cut from dough sheet 14 by pockets 113. Particularly, the slanting nature of the faces of the pyramid shape to a common vertex reduces the adhesive forces of dough to roller 18 within pockets 113 as would exist if pockets 113 had corners such as when pockets 113 would be formed by drilling. Additionally, even if the dough is not released from pockets 113, the dough will have resiliency to allow compression of dough from dough sheet 14 in later revolutions in pocket 113 to prevent excess migration of dough into cavities 112 as long as the dough is not allowed to dry and become hard within pocket 113. It should also be appreciated that dough cut from dough sheet 14 by pockets 113 are of a shape and size substantially different than cavities 112 for forming second pieces which are mechanically separable from the first pieces. Thus, when cavities 112 have nontesselated shapes, the first pieces are stamped from the central portion of continuous sheet 14, and the remaining portions of sheet 14 defining the scrap material are located between the first edges of the central portion and of sheet 14 and between the second edges of the central portion and of sheet 14 as well as in the central portion of sheet 14 as cut by pockets 113.

OPERATION OF THE INVENTION

Now that the basic construction of apparatus 10 and 16 according to the preferred teachings of the present invention has been explained, the operation of the production of the half product according to the preferred teachings of the present invention can be set forth and appreciated. Specifically, as diagrammatically shown in FIG. 1, the ingredients 120 for the formation of the dough are placed into a mixer 122 and thoroughly mixed. From mixer 122, the mixed ingredients 120 are fed to a cooker extruder 124 which cooks the ingredients 120 into dough which is extruded for formation into sheet 12. Sheet 12 is formed by a sheeting apparatus 126. In the most preferred form, dough sheet 12 is formed into folded continuous dough sheet 14 by apparatus 10. The first and second free edges are aligned relative to each other in folded dough sheet 14. Folded dough sheet 14 extends vertically downward from apparatus 10 into piece forming apparatus 16 and particularly between rollers 18 thereof.

As folded dough sheet 14 passes through rollers 18, dough sheet 14 is simultaneously stamped into first pieces having shapes and sizes corresponding to cavities 112 of portion 110 and into second pieces having shapes and sizes corresponding to pockets 113 and/or cavities 118 of portions 114 and 116. From apparatus 16, the first and second pieces of dough are fed into a drying oven 134 which reduces the moisture content to between 10% and 15%. From drying oven 134, the dried first and second pieces are fed to a separator 136 which mechanically separates the first pieces from the second pieces by utilizing conventional separation techniques. It can then be appreciated that the separated, dried first pieces are the half products in the production of the puffed snack product and can be further processed at that time or can be placed in storage for later processing at the same or different locations.

The separated, dried, second pieces can be ground by grinder 138 and added to ingredients 120 prior to or during the mixing in mixer 122, with ingredients 120 and the ground second pieces beginning the process again. It should then be appreciated that in the preferred form, portion 110 has a width such that in the range of 10% to 25% of folded dough sheet 14 results in scrap material which is cut by cavities 118 of portions 114 and 116 into the second pieces. This amount of scrap material insures that the first pieces cut by cavities 112 of portion 110 are all completely formed and possess the desired texture and appearance to create the half product which produces the finished product preferred by the consumer even with the normal placement variations in folded dough sheet 14 entering apparatus 16 and without requiring excessive supervision. It can be appreciated that if the presence of some incompletely formed first pieces is not detrimental to the marketing of the finished product, the amount of scrap material can be proportionally reduced while not exceeding the maximum amount of incompletely formed first pieces which is tolerated for the particular market. Since the scrap material is reused, the ingredient costs are substantially reduced especially considering the excess of scrap material utilized to insure the uniform production of finished product.

It should then be noted that the production of half products of the type of the present invention involves problems not encountered in the production of other types of products. Specifically, in the production of cookies, crackers, or tortilla chips, the pieces are typically cut from the dough sheet prior to cooking such that the dough is not at an elevated temperature and can be readily mixed in with the dough before its entry into the sheeting device. However, pieces for forming half products are cut from cooked dough which is hot. It can then be appreciated that the heated, cooked dough looses moisture after leaving the die of cooker extruder 124. Thus, even if the cooked dough could somehow be fed back to the process at or before sheeting apparatus 126, such refed cooked dough would not have the same consistency as the freshly cooked dough and would not produce a uniform sheet. Also, when cooked dough cools, the viscosity and toughness of the cooked dough changes. If mixed with freshly cooked dough, the dough sheet produced thereby would not be uniform as desired. Also, cooked dough which has not been dried is not very stable and will tend to get moldy or have other undesired effects if not processed in short times.

Additionally, cooked, nondried dough is very sticky and difficult to handle. Thus, it is very difficult to feed cooked, nondried dough to cooker extruder 124 at an even, controlled rate. Likewise, the cooked, nondried dough will often clog together. Additionally, the dough is typically pneumatically transferred to drying oven 134. However, sheets or strips (with the first pieces removed) or large chunks of dough can not be transferred pneumatically due to the tendency of plugging. Further, even if transferable to drying oven 134, such sheets, strips, or large chunks of dough would adversely affect the operation and efficiency of drying the first pieces to form the half product. Thus, the formation of the smaller, second pieces allows for ease of handling such as the pneumatic transfer with the first pieces to drying oven 134, with the second pieces being dried with the first pieces in drying oven 134 without detrimentally affecting the operation and efficiency of drying oven 134. After drying, the second pieces can be easily and accurately handled (including their separation from the first pieces) and are extremely stable allowing either their immediate or later further processing according to the teachings of the present invention.

The present apparatus thus is particularly useful in connection with the continuous, high production capacity manufacture of two-ply laminated snack half products. However, the teachings of the present invention may be applicable to other environments where recouping of scrap material during the formation of first pieces from a continuous sheet and like advantages are desired.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for recouping scrap material during the formation of first pieces of nontesselating shapes from a continuous sheet, with the sheet having first and second side edges, comprising the steps of: stamping the first pieces of nontesselating shapes from the continuous sheet intermediate the first and second edges of the continuous sheet with the portions remaining in the continuous sheet defining the scrap material, with the remaining portions located between the first pieces of nontesselating shapes; simultaneously stamping the remaining portions of the continuous sheet into second pieces of a size and shape mechanically separable from the first pieces of nontesselating shapes; and mechanically separating the first pieces of nontesselating shapes from the second pieces.

2. The method of claim 1 wherein the simultaneously stamping step comprises the step of simultaneously stamping the remaining portions of the continuous sheet into second pieces of a different size than that of the first pieces.

3. The method of claim 2 wherein the simultaneously stamping step comprises the step of simultaneously stamping the remaining portions of the continuous sheet into second pieces of a smaller size than that of the first pieces.

4. The method of claim 3 wherein the simultaneously stamping step comprises the step of simultaneously stamping the remaining portions of the continuous sheet into second pieces of a different shape than that of the first pieces.

5. The method of claim 1 wherein the simultaneously stamping step comprises the step of simultaneously stamping the remaining portions of the continuous sheet into second pieces of a different shape than that of the first pieces.

6. The method of claim 1 wherein the continuous sheet has a moisture content, and wherein the method further comprises the step of drying the first and second pieces to reduce their moisture content before the mechanically separating step.

7. The method of claim 6 further comprising the step of grinding the second pieces after the mechanically separating step.

8. The method of claim 1 wherein the stamping step comprises the step of stamping the first pieces from a central portion of the continuous sheet, with the central portion having a first edge spaced from the first edge of the continuous sheet and a second edge spaced from the second edge of the continuous sheet, with the remaining portions of the continuous sheet located generally exclusively between the first edges of the central portion and of the continuous sheet and between the second edges of the central portion and of the continuous sheet.

9. The method of claim 1 wherein the stamping step comprises the step of stamping the first pieces from a central portion of the continuous sheet, with the central portion having a first edge spaced from the first edge of the continuous sheet and a second edge spaced from the second edge of the continuous sheet, with the remaining portions of the continuous sheet also located between the first edges of the central portion and of the continuous sheet and between the second edges of the central portion and of the continuous sheet.

10. The method of claim 1 wherein the stamping and simultaneous stamping steps comprise the step of rolling at least one roller past the continuous sheet, with the roller having first and second cavities, with the first cavities stamping the first pieces from the continuous sheet intermediate the first and second edges of the continuous sheet with the portions remaining in the continuous sheet defining the scrap material, with the second cavities simultaneously stamping the remaining portions of the continuous sheet into second pieces of a size and shape mechanically separable from the first pieces.

11. The method of claim 10 wherein the step of rolling at least one roller comprises the step of rolling at least one roller having a central portion extending circumferentially around the roller and located intermediate the ends of the roller, with the first cavities exclusively located in the central portion and the second cavities located exclusively on the opposite sides of the central portion, with the roller having pockets located in the central portion intermediate the first cavities for simultaneously stamping the remaining portions of the continuous sheet into the second pieces of a size smaller than and mechanically separable from the first pieces.

12. Method for forming a half product for producing a puffed product comprising the steps of: mixing the ingredients to form a dough; cooking the dough; sheeting the cooked dough into a continuous sheet having first and second side edges; stamping first pieces of nontesselating shapes from the continuous sheet intermediate the first and second edges of the continuous sheet, with the portions remaining in the continuous sheet defining scrap material, with the remaining portions located between the first pieces of nontesselating shapes; simultaneously stamping the remaining portions of the continuous sheet into second pieces of a size and shape mechanically separable from the first pieces of nontesselating shapes; drying the first and second pieces to reduce their moisture content; mechanically separating the dried first pieces of nontesselating shapes from the dried second pieces; grinding the separated dried second pieces; and adding the ground second pieces to the ingredients prior to or during the mixing step.

13. The method of claim 12 further comprising the step of flipping and aligning the continuous sheet into a folded continuous two-ply sheet prior to the stamping steps.

14. The method of claim 13 wherein the stamping step comprises the step of stamping the first pieces from a central portion of the continuous sheet, with the central portion having a first edge spaced from the first edge of the continuous sheet and a second edge spaced from the second edge of the continuous sheet, with the remaining portions of the continuous sheet also located generally exclusively between the first edges of the central portion and of the continuous sheet and between the second edges of the central portion and of the continuous sheet.

15. The method of claim 13 wherein the simultaneously stamping step comprises the step of simultaneously stamping the remaining portions of the continuous sheet into second pieces of a smaller size than that of the first pieces.

16. The method of claim 13 wherein the simultaneously stamping step comprises the step of simultaneously stamping the remaining portions of the continuous sheet into second pieces of a different shape than that of the first pieces.

17. The method of claim 12 wherein the stamping step comprises the step of stamping the first pieces from a central portion of the continuous sheet, with the central portion having a first edge spaced from the first edge of the continuous sheet and a second edge spaced from the second edge of the continuous sheet, with the remaining portions of the continuous sheet also located between the first edges of the central portion and of the continuous sheet and between the second edges of the central portion and of the continuous sheet.

18. The method of claim 12 wherein the stamping and simultaneous stamping steps comprise the step of rolling at least one roller past the continuous sheet, with the roller having first and second cavities, with the first cavities stamping the first pieces from the continuous sheet intermediate the first and second edges of the continuous sheet with the portions remaining in the continuous sheet defining the scrap material, with the second cavities simultaneously stamping the remaining portions of the continuous sheet into second pieces of a size and shape mechanically separable from the first pieces.

19. The method of claim 18 wherein the step of rolling at least one roller comprises the step of rolling at least one roller having a central portion extending circumferentially around the roller and located intermediate the ends of the roller, with the first cavities exclusively located in the central portion and the second cavities located exclusively on the opposite sides of the central portion, with the roller having pockets located in the central portion intermediate the first cavities for simultaneously stamping the remaining portions of the continuous sheet into the second pieces of a size smaller than and mechanically separable from the first pieces.

20. Apparatus for recouping scrap material during the formation of first pieces of nontesselating shapes from a continuous sheet, with the sheet having first and second side edges, comprising, in combination: a piece forming apparatus including at least one roller, with the roller having first and second cavities, with the first cavities stamping the first pieces of nontesselating shapes from the continuous sheet intermediate the first and second edges of the continuous sheet with the portions remaining in the continuous sheet defining the scrap material, with the second cavities simultaneously stamping the remaining portions of the continuous sheet into second pieces of a size and shape mechanically separable from the first pieces of nontesselating shapes; and means for mechanically separating the first pieces of nontesselating shapes from the second pieces.

21. The apparatus of claim 20 wherein the second pieces have a different size than the first pieces.

22. The apparatus of claim 21 wherein the second pieces have a different shape than the first pieces.

23. The apparatus of claim 21 wherein the second pieces are smaller than the first pieces.

24. The apparatus of claim 20 further comprising, in combination: means for simultaneously drying the first and second pieces; and means for grinding the dried second pieces.

25. The apparatus of claim 20 wherein the first cavities are located in a central, circumferential portion of the roller; and wherein the second cavities are located exclusively in first and second, circumferential boundary portions of the roller located outside of and on opposite sides of the central portion.

26. The apparatus of claim 20 wherein the second pieces have a different shape than the first pieces.

27. The apparatus of claim 20 wherein the roller has a central portion extending circumferentially around the roller and located intermediate the ends of the roller, with the first cavities exclusively located in the central portion and the second cavities located exclusively on the opposite sides of the central portion.

28. The apparatus of claim 20, wherein the roller has a central portion extending circumferentially around the roller and located intermediate the ends of the roller, with the first cavities exclusively located in the central portion and the second cavities located exclusively on the opposite sides of the central portion, with the roller having pockets located in the central portion intermediate the first cavities for simultaneously stamping the remaining portions of the continuous sheet into the second pieces of a size smaller than and mechanically separable from the first pieces.

29. Apparatus for formation of first pieces from a continuous sheet, with the sheet having first and second side edges, comprising, in combination: a piece forming apparatus including at least one roller having a periphery; first cavities having the shape of the first pieces extending from the periphery of the roller radially inwardly; lands located between the first cavities defining the cavities for stamping the first pieces from the continuous sheet, with the portions remaining in the continuous sheet between the first pieces defining scrap material, with at least first areas of the lands at the periphery being defined between the portions of the cavities which are in juxtaposition and second areas of the lands at the periphery being defined between the portions of the cavities which are not in juxtaposition, with the second areas being substantially larger than the first areas; and pockets formed in the second areas extending from the periphery of the roller radially inwardly, with the pockets simultaneously stamping the scrap material of the continuous sheet between the first pieces into second pieces of a size smaller than and mechanically separable from the first pieces, with the simultaneous stamping of the second pieces by the pockets reducing migration of the scrap material into the first cavities while the lands stamp the first pieces from the continuous sheet.

30. The apparatus of claim 29 wherein each of the pockets extend from the periphery to a common vertex.

31. The apparatus of claim 30 wherein the pockets are pyramid shaped.

32. The apparatus of claim 31 wherein the common vertex has a depth from the periphery less than the depth of the first cavities from the periphery.

33. The apparatus of claim 32 wherein the first cavities have a bottom surface concentric to the periphery of the roller.

34. The apparatus of claim 33 wherein the land areas are beveled at the periphery inside of the cavities.

35. The apparatus of claim 30 wherein the common vertex has a depth from the periphery less than the depth of the first cavities from the periphery.

36. The apparatus of claim 29 wherein the roller has second cavities for stamping the second pieces from the continuous sheet, with the roller having a central portion extending circumferentially around the roller and located intermediate the ends of the roller, with the first cavities' exclusively located in the central portion and the second cavities located exclusively on the opposite sides of the central portion, with the pockets located in the central portion intermediate the first cavities.

\* \* \* \* \*